Oct. 25, 1949.                    J. W. ROBERTSON                    2,485,658
              RADIO FREQUENCY POWER HEATING APPARATUS AND METHOD
Filed Nov. 5, 1945                                          2 Sheets-Sheet 1
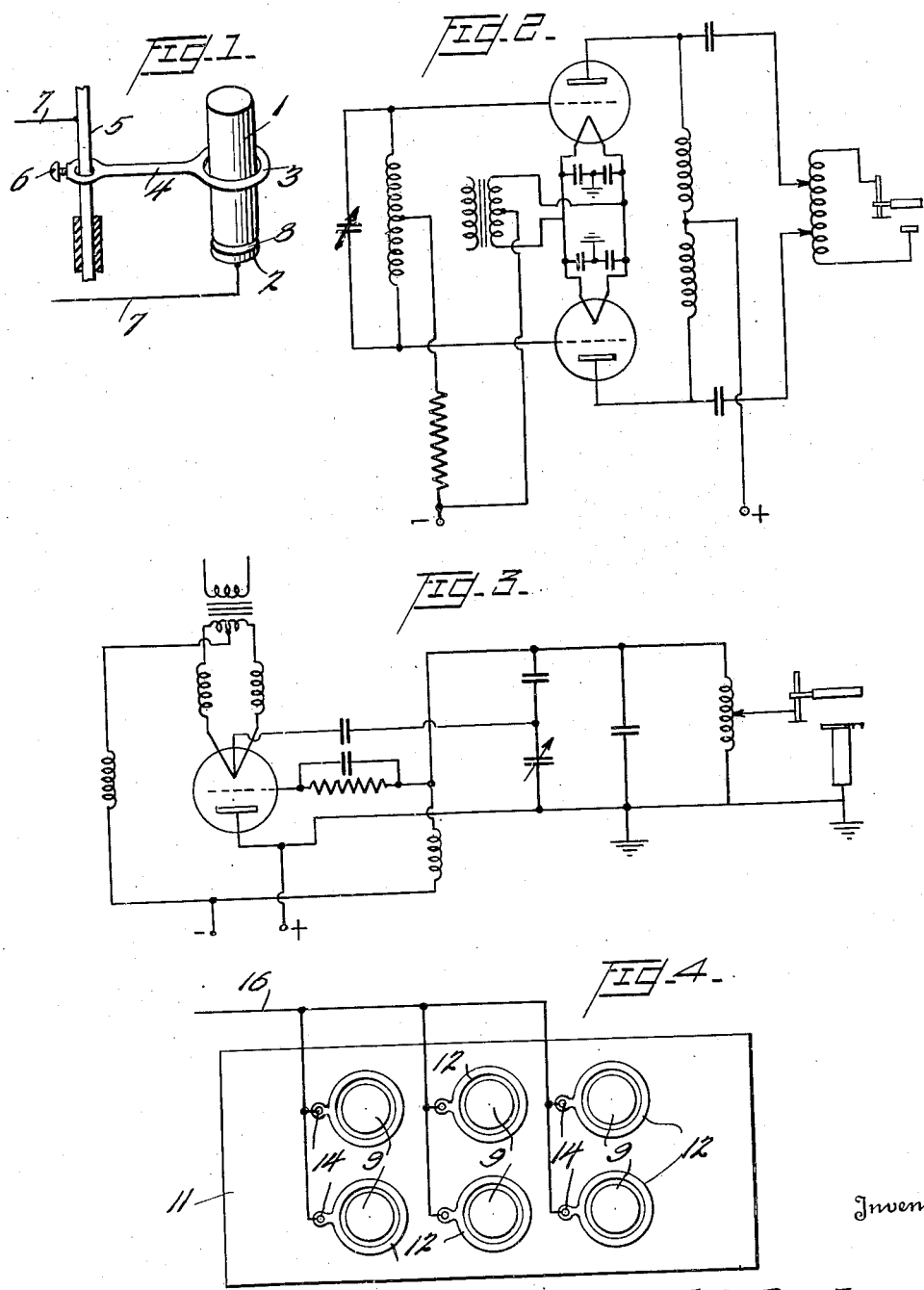
Inventor
John W. Robertson,
By Sol Shappirio
            Attorney Oct. 25, 1949.  J. W. ROBERTSON  2,485,658
RADIO FREQUENCY POWER HEATING APPARATUS AND METHOD
Filed Nov. 5, 1945  2 Sheets-Sheet 2
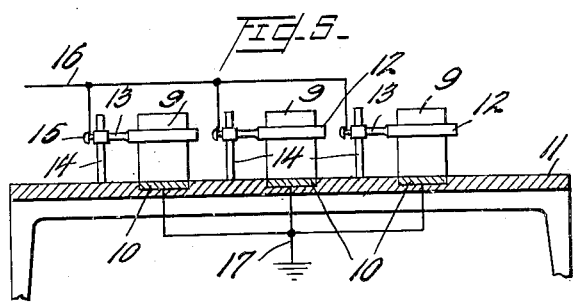
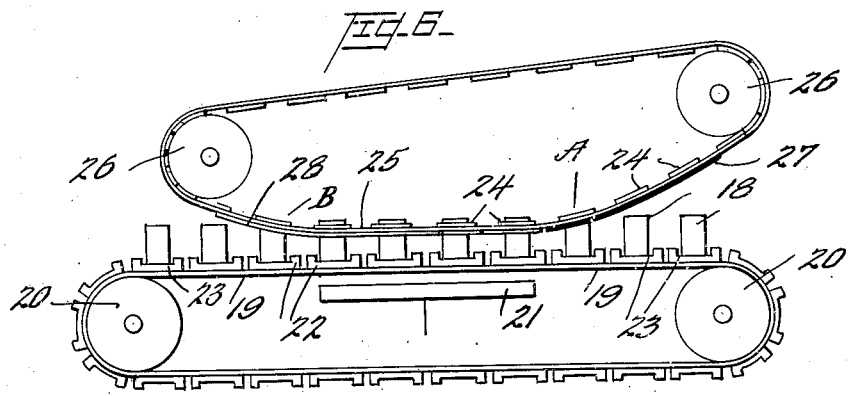
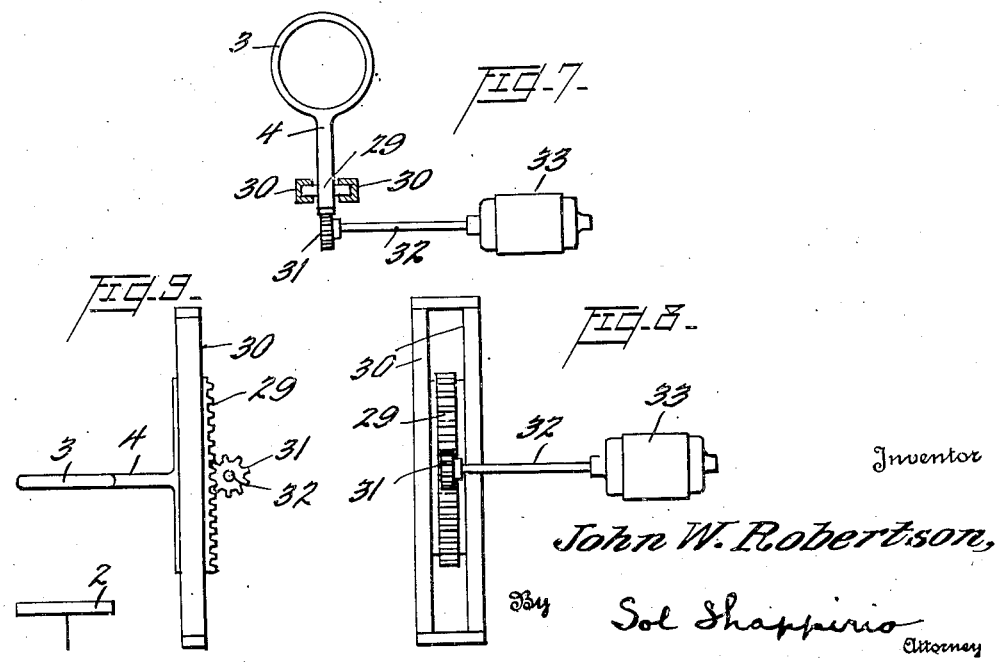
Inventor
John W. Robertson,
By Sol Shappirio
Attorney Patented Oct. 25, 1949

2,485,658

UNITED STATES PATENT OFFICE 2,485,658

RADIO-FREQUENCY POWER HEATING APPARATUS AND METHOD

John W. Robertson, Englewood, N. J., assignor, by direct and mesne assignments, of one-half to Ellis-Foster Company, Montclair, N. J., a corporation of New Jersey, and one-half to Montclair Research Corporation, a corporation of New Jersey Application November 5, 1945, Serial No. 626,860

13 Claims. (Cl. 219—47)

This invention relates to apparatus for heating various materials, particularly in batch form, and to methods of heating such materials, particularly by the application of radio frequency power.

The use of radio frequency power for heating "dielectric" types of materials by placing the material between condenser plates has become widespread for some specialized applications, usually involving solid materials of uniform shape and of homogeneous nature. Under these conditions heating is quite uniform, but for uniformly heating non-homogeneous mixtures such as suspended solid matter, or for heating cylindrical types of containers such as are used in reacting chemicals or for "canned" foods, the conventional arrangement of condenser plates (electrodes) is not satisfactory.

In the practice of heating by the "dielectric loss" method using high frequency power, it has been found that the heating is extremely non-uniform except when special conditions exist. The materials being heated must be essentially homogeneous in nature, and, if liquid, there should be no path provided for surface conduction or "skin effect" conductivity at the surface of the container. Dielectric "loss factor" rises with higher temperatures and when the surface begins to be heated by "conduction currents" to a greater extent than the mass is heated by a combination of "conduction currents" and "displacement currents," the surface temperature will rise rapidly to undesirable proportions. This over-heating of surfaces is noticed for example in heating molten resins to carry out chemical reactions and in heating water or other solutions of different kinds of materials, or in heating suspensions of materials. The surface heating effect is more noticeable with increasing conductivity of the material undergoing treatment.

Among the objects of the present invention is apparatus which enables heating to be effectively carried out by utilizing radio frequency power.

Further objects include such apparatus and its utilization under conditions which in prior art practice would give rise to non-uniform heating.

Further objects include means for controlling and regulating the heating effect obtained as well as for controlling the heating effect produced at particular portions of the material undergoing heat treatment.

Still further objects include methods for effecting the heating operations referred to above.

Still further objects and advantages of the present invention will appear from the more detailed description set forth below, it being understood that this more detailed description is given by way of illustration and explanation only, and not by way of limitation, since various changes therein may be made by those skilled in the art without departing from the scope and spirit of the present invention.

In accordance with that more detailed description, there is shown in the accompanying drawing, in Figure 1, one form of apparatus that may be utilized in carrying out the present invention; in Figure 2, a typical push-pull oscillator circuit; in Figure 3, a grounded plate oscillator circuit; in Figure 4, a plan view of a further type of apparatus that may be employed; in Figure 5, a side elevation of the apparatus shown in Figure 4; in Figure 6, another form of apparatus that may be employed in accordance with the present invention; in Figure 7, a top plan view of an operating detail; in Figure 8, a front elevation thereof; and in Figure 9, a side elevation thereof.

In accordance with the present invention, heating is carried out by the use of radio frequency power applied to a wide variety of materials to obtain uniform temperature rise for sterilization purposes, for cooking, or for carrying out chemical reactions, etc., as well as methods in which the heat treatment may be controlled to provide for particular heating effects at portions of the material as desired, under conditions which can be duplicated when desired. The materials undergoing heat treatment may be contained in relatively large containers and be processed at high frequencies by the utilization of electrodes which are not large parallel plates. By this method the capacity of any condenser effect is relatively low, and the practical frequency of a large installation can be higher. Furthermore, at least one of the electrodes is made adjustable in position with respect to the material undergoing treatment in order to direct the heating effect which is obtained to a particular portion of the material if at such point more rapid heating is desired, or to enable uniform heating to be maintained as may be desired.

In carrying out the invention, therefore, it is most desirable to provide uniformity of heat treatment conditions by an electrode arrangement of low capacity which is particularly essential in the use of higher industrial frequencies, as for example, in the range of from 20 to 200 megacycles. These results are readily secured by utilizing electrodes for supplying the power, which electrodes are different with respect to one another to control the effect produced. Desirably one electrode is of plate type which is placed at or adjacent to the container containing the material to be heat treated, as for example, at the bottom thereof, while the other electrode is spaced therefrom and may desirably be of ring type to encircle the container at a distance from the plate type electrode. There are numerous ways of employing the ring and plate arrangements of electrodes each having its particular usefulness depending upon the apparatus available and the specific method to be carried out.

One form of apparatus that may desirably be employed in this connection is illustrated in Figure 1 of the drawing. As there shown, the container 1 of glass or other dielectric material is positioned with respect to a plate electrode 2 and a ring electrode 3. The plate electrode 2 is placed adjacent the bottom of the container 1 while the ring electrode 3 is positioned at a distance from the plate electrode 2, and encircles the container 1.

For convenience, the vessel containing the material to be heated, is desirably cylindrical in shape, as illustrated in Figure 1; but it may take any other desirable shape such as rectangular, etc., with the electrodes conforming. The invention can best be illustrated by the cylindrical shape.

When the cylindrical container 1 is employed, the plate electrode 2 is in the form of a flat circular plate of metal, while the ring metal electrode 3 may be carried on arm 4, supported on standard 5. The elements 4 and 5 are desirably of metal and serve as means for electrically connecting the ring electrode to the source of power. The arm 4 may be adjustably mounted on the standard 5 by means of thumb screw 6. Power may be supplied through the power lines 7, 7.

Instead of a single ring metal electrode and plate electrode, two adjustable rings may be used, as for example two torus shaped, encircling electrodes both adjustable which may be desirably used in control of heat distribution during processing.

In a power oscillator of "push-pull" design for generating the high frequency power, it is most desirable to maintain a symmetrical circuit arrangement and this will cause both electrodes to be at equal potential with respect to ground and both will need to be well insulated. This type of equipment will be desirable in many cases, but certain factors of electrode arrangement are desirably considered. It has been found that heating is likely to be more rapid in close proximity to such an electrode at a voltage of the order of 10,000, than it is at a point in between the two electrodes which is at a lower potential with respect to ground. It has been found that corona discharges (usually invisible) are possible under some conditions at the highest voltage points and this added energy dissipation causes overheating and even visible discharges at times. Under some conditions this actually happens when the vessel or container (glass or similar insulating material) containing the mass to be heated is placed directly on the plate electrode and is air spaced from the ring.

To overcome localization of heating or possible overheating of the bottom of such a vessel, the vessel is desirably spaced from the plate electrode. Air spacing may be employed, but under commercial conditions may offer mechanical difficulties. Where the container or vessel is to be placed adjacent to such plate electrode, as for example, in being placed directly on such electrode, it is found desirable to utilize a material of low power loss factor between the bottom of the vessel or container 1 and the plate electrode 2. Such low power loss factor material is indicated at 8 in Figure 1. The type of material to be used depends on the particular conditions of the operation being carried out. A block of sintered Pyrex glass of suitable thickness is fairly useful where the conditions are not such that there is rapid heating of such block of material. More desirably a material of lower loss factor may be employed such as sintered or porous "Nonex" glass or "Vycor" (96% silica) glass or quartz or volcanic rock or pumice stone or fibers of these materials. A simple means that may be employed for heating stationary containers, as for example, in the heat treatment of smaller vessels or containers, for example, in laboratories, consists in employing a piece of "Mycalex" (mica and glass) sheet together with a folded piece of glass cloth to provide added spacing with a large percentage of air insulation. Such insulation between the vessel or container 1 and the plate electrode 2 sufficiently controls the heating operations with respect to the vessel or container 1 and the electrode 2. Insulation of the ring electrode 3 is desirably by air spacing from the upper part of the container.

The positioning of the ring electrode 3 with respect to the material undergoing heat treatment must be taken into effect since the "skin effect" currents at a surface which has some degree of conductivity can cause local overheating. A study of surface heating effects on liquids of varying conductivity indicates that vapors above the surface of the liquid (or a solid of low vapor pressure) can behave in much the same manner as sharp edges or points of metal in initiating corona discharges; and thus when a surface is at high potential, these discharges start (usually invisibly) and cause rapid heating of the surface. This has been observed on salt solutions at 20° C. and on molten synthetic resins at 250° C.

Such considerations, therefore, are highly important in positioning the ring electrode to produce the particular result desired. In order to obtain the best field distribution for uniform heating, the ring should be as high as possible, even above the surface of the batch of material undergoing treatment. But this is undesirable in those cases where too much surface heating takes place due to the phenomena described above. In such cases the ring should be lowered until it is even with the surface or below the surface of the material undergoing heat treatment, depending on the conductivity of the batch and the desirability of heating the surface faster than the body.

Thus by variation of the height adjustment of the ring electrode 3 (which may be done readily by hand or by a small electric motor geared suitably to an insulated shaft), means are provided for quickly, continuously, and for automatically adjusting and controlling the temperature of the upper part of the batch being heated.

The temperature control of the lower part of the batch has been partially described in discussing the means for spacing the vessel or container from the bottom electrode. This control has been found to be dependent to a large extent upon the dielectric loss factor of the container itself, because the heating rate of the batch in contact with the bottom depends upon whether the bottom heats faster or more slowly than the batch itself. The conductivity and dielectric loss factor of the batch of material, is also highly important in relation to the material of the container and so also is the material used for spacing the container and the distance of such spacing with respect to the plate electrode.

Other methods of application may be used. Thus there may be used blocks of high dielectric loss material, especially of larger surface area such as sintered, high loss glass to be positioned in the container where a chemical reaction is being carried out and placed at a point where greatest heating effect is desired. For example, it might be desirable to heat the bottom part of the batch faster in order to get bubbling and boiling in the conventional sense for purposes of recirculating or agitating the fluid mass. The differential in temperature can be further controlled by suitable adjustment of the loss factor of the material. Or it might be desired to heat two immiscible liquids more rapidly at their interface without rapid agitation to disperse one in the other. This interface could be heated more rapidly by having the liquid junction take place in a "slab" of sintered material of suitable dielectric loss factor. Glass is well adapted to the manufacture of material of controlled loss factor. A further variation is to use mechanical agitation in the reacting mass and building the agitator itself of a high loss material such as sintered glass which can be molded to any desired shape. Thus it would be the hot part of the mass and would throw the heated material centrifugally as it revolved. Such features illustrate various ways in which the control may be effected.

Thus by the adjustment of the factors discussed above, almost any reasonable degree of control of temperature can be obtained for a given processing or treatment, especially for liquids and homogeneous materials. For non-homogeneous products such as the sterilization of solid and irregular shaped pieces of foodstuffs, variations of the apparatus and methods may be made depending on the factors involved.

The ring and plate arrangement of electrodes as described above has been used extensively in cooking resins in flasks and beakers, and in cooking and/or sterilizing foods in individual glass jars for purposes of storage until needed, etc.

The ring and plate arrangement described above may be utilized for testing purposes and also for establishing standard conditions for heat treatment of particular materials. In this way it is possible to establish uniform methods under standard conditions of spacing, voltage, frequency, etc., to determine the factors involved in any particular processing operation. The loss factor may be empirically determined under particular conditions for purposes of comparison with other materials. This type of testing procedure may be carried out as an actual heating rate determination by measuring temperature rise against time and may be particularly useful in supplying practical information to operators of equipment, particularly when the latter are not physicists. The heating of the range of materials which will be used in industrial practice is so complicated by the effect of displacement currents (true dielectric loss), conduction currents (resistance loss), "skin effect," corona discharges, and possibly other unknown effects, that it is desirable to provide an apparatus which enables an empirical determination of the factors involved in any particular processing method to be determined. This is readily carried out with the ring and plate arrangement. In such event a small vessel or container such as a test tube of standardized size, as for example, ⅝ inch by 5 inches, and made of quartz, may be suspended from its top and hang through a ring electrode as illustrated in Figure 1 to within ½ cm. of the flat plate electrode 2. Apparatus of this character enables a standardization of the heating effects to be investigated and carried out to determine heating rates or power absorption rates of a variety of materials under analogous conditions.

While the methods and apparatus described above, have been based on the "symmetrical" output circuit of the oscillator or oscillator and amplifier wherein the two output electrodes remain at high potential, other methods and systems may be employed. It is also good practice in radio frequency dielectric heating, to use only one high voltage electrode with the other electrode directly grounded. The two methods are practically interchangeable but one may be preferred for a given operation and should be considered with respect to particular equipment for such operation. The grounded electrode design is desirable in many cases for certain safety factors alone and is particularly true where the operations will be carried out without particular technical supervision. Such an operation and apparatus for carrying out is illustrated in Figures 4 and 5 of the drawing. This illustrates heating operations carried out where kettles and vats in manufacture of chemicals are employed, or where food is cooked in large quantities. It is also applicable to equipment for the purpose of quickly heating to serving temperature, foods which are kept cool after cooking, in order to preserve their best flavor, and preservation of other values such as vitamin, digestability, etc. In such cases the circular ring electrode working against the ground as the other terminal, is preferred both for batch cooking and for heating rapidly to serving temperature in smaller vessels.

As illustrated in Figures 4 and 5, a plurality of vessels 9, 9 (which may be double walled cylindrical pots if desired) are seated on plate electrodes 10 between which there may be interposed dielectric material corresponding with that shown at 8 in Figure 1. The plate electrodes 10 are positioned on the top of a table or other support 11 and may be carried within wells (not shown) in such table top 11, if desired. Ring electrodes 12 encircle the containers or vessels 9, 9, and may be positioned in a manner analogous to that explained in connection with Figure 1 by providing arms 13, 13 for maintaining the ring electrodes 12, 12 in position encircling the containers 9, 9 at a distance from the plate electrodes 10, 10. Such arms 13, 13 may be carried on supports 14, 14, on which they may be adjustably mounted by means of thumb screws 15, 15, all as explained above in connection with Figure 1. Power may be supplied by the power line 16 connected to the ring electrodes 12, 12, while the plate electrodes are grounded as shown at 17.

The apparatus and methods of the present invention may be utilized in commercial practice for continuous treatment of vessels or containers containing batches of materials to undergo heat treatment, as for example, in treating glass jars of food. In such cases, the vessels or containers may be placed on a moving conveyor and carried through the heat treatment zone in which they are subjected to radio frequency heating. As illustrated in Figure 6, the containers 18, 18 are placed on the continuous belt 19, operating over rolls 20, 20, and are fed forwardly into a heat treatment zone defined by the lower plate electrode 21, contiguous to the lower portion of the belt 19. The latter is desirably made of insulating or dielectric material and carries the containers forward continuously over the electrode 21. For example, the belt 19 may desirably be of glass fabric with sintered glass or other low loss dielectric material cemented to it as thin blocks 22, 22, containing a small depression or "well" 23 in each to carry the jar 18 in a fixed position. At the time that the containers reach a position over the electrode 21, they are encircled by the ring electrodes 24, 24 and power is applied to effect the heating during the passage of the containers through the heating zone over the electrode 21. After the containers leave that zone, the ring electrodes are removed and the containers passed then to storage or any other desirable treatment.

Various means may be utilized for lowering the ring type electrodes into position at the proper time, to maintain them in such position, and to remove them from the containers after the containers have passed through the heating zone. For example, a series of such ring electrodes may form a continuous chain in the shape of an endless belt arrangement, the electrodes dropping over the containers as they reach position A in Figure 6, and being removed as they reach position B, the length of the heat treatment zone being sufficient to carry out the particular processing employed. The rings and associated structure can be of very thin wall, light weight tubing carried in or on a moving glass cloth belt 25 which is long enough and loose enough on the rolls 26 to allow it to be guided into place over the jar position below. The rings may if desired, "ride" on "rails" of insulating material 27 as they are being lowered and these "rails" may be changed to metal 28 and connected to a high voltage electrode for the distance corresponding to the electrode below. In fact, the metal part of the "rail" may continue well past the bottom electrode if it is desirable to develop extra steam at the surface of the jar just prior to sealing. This "steaming off" process is effected by bringing a single, high voltage electrode in proximity of the surface of the liquid and it apparently produces invisible corona in the surface vapor thus heating it rapidly. The ring will produce this effect if still at high potential as it is slowly lifted past the surface of the liquid. The jar may be sealed at this point, or have the liquid level adjusted, or simply removed from the belt. Such operations may be carried on continuously for sterilization purposes, for cooking operations, or for carrying out chemical reactions.

It may be pointed out also that all of the processes set forth may be carried out in a pressure chamber in order to quickly heat to any desired temperature above the boiling point of water in order to get quicker and better sterilization, etc. This has been found to be of especial value in processing non-acid vegetables.

The motor adjustment of the ring electrode referred to above in connection with Figure 1, may be carried out by a simple rack and pinion arrangement shown in Figures 7 to 9. The ring electrode 3 on arm 4 which may provide a flexible connection, is mounted on rack 29 adapted to move within the channel members 30, 30 providing a track for the rack 29. A pinion gear 31 meshes with rack 29, the gear 31 being keyed to the shaft 32 rotated by the motor 33. Operation of the motor will rotate the pinion gear and cause the rack to move up or down in the track. The motor and associated circuits should be well shielded and protected from high voltage R. F. effects, as is commonly done in radio engineering for remote control.

While any desired types of circuits can be used, typical circuits are shown in the drawings. In Figure 2, a push-pull oscillator suitable for industrial high frequency heating, is shown, the work circuit not being grounded. In Figure 3 there is illustrated a grounded plate oscillator suitable for industrial high frequency heating.

Having thus set forth my invention, I claim:

1. Apparatus for heating by radio frequency power comprising a container having a bottom closure, all of dielectric material, to contain the material to be heated, an electrode adjacent the bottom of the container, and a second electrode encircling the container externally thereof spaced from said first electrode, and means for supplying radio frequency power to said electrodes.

2. Apparatus for heating by radio frequency power comprising a cylindrical container having a bottom closure, all of dielectric material, to contain the substance to be heated, a circular plate electrode adjacent the bottom of the container and separated from said end of the container by a dielectric material of low power loss factor, a torus shaped electrode encircling the container externally thereof spaced from said first electrode, and means for supplying radio frequency power to said electrodes.

3. Apparatus as set forth in claim 1, including means for varying the distance between the electrodes.

4. Apparatus as set forth in claim 2, including means for varying the distance between the electrodes.

5. Apparatus for heating a plurality of containers by radio frequency power comprising an endless belt, a plate electrode at one portion of the path travelled by said belt, said electrode being contiguous to the lower portion of said belt, a plurality of ring electrodes positioned above said belt, means to move said ring electrodes about containers when placed on said belt to encircle the containers at a distance above said plate electrode, by the time said containers have moved over said plate electrode, means to remove said ring electrodes from about the containers by the time said containers have moved from a position over said plate electrode, and means for supplying radio frequency power to said electrodes.

6. Apparatus for heating by radio frequency power comprising a support for a plurality of containers to be heated, a plurality of plate electrodes spaced from one another carried on said support, a plurality of ring shaped electrodes carried on said support and positioned above said plate electrodes, the ring electrodes being adapted to encircle the containers when the latter are placed on the plate electrodes, and means for supplying radio frequency power to said electrodes.

7. Apparatus as set forth in claim 6, including means for varying the distance of the ring electrodes from the plate electrodes.

8. The method of heating batch materials in containers, which comprises applying radio frequency power to a batch of dielectric material to be heated by dielectric loss from electrodes, one of which electrodes encircles the container at a distance from the other electrode, and positioning the encircling electrode with respect to the upper surface of the material undergoing treatment to control the heating effect obtained at the surface of the material.

9. The method of heating batch materials in containers, which comprises applying radio frequency power to a batch of dielectric material to be heated by dielectric loss from electrodes, one of which electrodes encircles the container at a distance from the other electrode, and controlling the heating effect produced by the dielectric properties of the medium between the container and one of the electrodes.

10. The method of heating which comprises continuously passing a plurality of containers containing dielectric materials to be heated through a heating zone, applying radio frequency power to the materials while within said heating zone to heat the containers by dielectric loss, and discontinuing the application of said power to said materials after they have emerged from said heating zone.

11. The method of claim 10, in which the power is supplied through dissimilar spaced electrodes.

12. The method of claim 11, in which one electrode is a plate electrode adjacent an end of the container.

13. The method of claim 8 in which the batch of material is non-homogeneous and the encircling electrode is positioned with respect thereto to give substantially uniform heating of the non-homogeneous batch.

JOHN W. ROBERTSON.

REFERENCES CITED

The following references are of record in the file of this patent:

UNITED STATES PATENTS

| Number | Name | Date |
| --- | --- | --- |
| 1,555,258 | Allcutt | Sept. 29, 1925 |
| 1,959,390 | Smith | May 22, 1934 |
| 2,042,145 | Darrah | May 26, 1936 |
| 2,231,457 | Stephen | Feb. 11, 1941 |
| 2,303,341 | Dufour et al. | Dec. 1, 1942 |
| 2,341,617 | Hull | Feb. 15, 1944 |
| 2,404,191 | Quayle et al. | July 16, 1946 |
| 2,413,003 | Sherman | Dec. 24, 1946 |